United States Patent
Ribeiro et al.

(10) Patent No.: US 12,129,811 B2
(45) Date of Patent: *Oct. 29, 2024

(54) PISTON MADE USING ADDITIVE MANUFACTURING TECHNIQUES

(71) Applicant: Federal-Mogul Corporation, Southfield, MI (US)

(72) Inventors: Carmo Ribeiro, Ann Arbor, MI (US); Owen Lu, Northville, MI (US); Thomas Egerer, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/245,138

(22) Filed: Apr. 4, 2014

(65) Prior Publication Data

US 2014/0299091 A1 Oct. 9, 2014

Related U.S. Application Data

(60) Provisional application No. 61/808,976, filed on Apr. 5, 2013.

(51) Int. Cl.
*F02F 3/00* (2006.01)
*B22F 5/00* (2006.01)
*B22F 10/28* (2021.01)

(52) U.S. Cl.
CPC ............ *F02F 3/0084* (2013.01); *B22F 5/008* (2013.01); *B22F 10/28* (2021.01);
(Continued)

(58) Field of Classification Search
CPC ............ F02F 3/0084; F02F 2003/0007; F02F 2200/04; F02F 2200/06; F02F 3/003;
(Continued)

(56) References Cited

U.S. PATENT DOCUMENTS

| 4,074,616 A | 2/1978 | Gale et al. |
| 4,125,926 A | 11/1978 | Gale et al. |

(Continued)

FOREIGN PATENT DOCUMENTS

| CN | 103016194 A | 4/2013 | |
| DE | 102009058970 A1 * | 6/2011 | ............ F02B 47/08 |

(Continued)

OTHER PUBLICATIONS

Machine Translation of DE102009058970A1 pdf File NAme: "DE102009058970A1_Machine_Translation.pdf".*

(Continued)

*Primary Examiner* — Grant Moubry
*Assistant Examiner* — Ruben Picon-Feliciano
(74) *Attorney, Agent, or Firm* — Robert L. Stearns; Dickinson Wright PLLC

(57) ABSTRACT

A monobloc piston body for an internal combustion engine is provided. The piston body includes a first piece which includes a pair of skirt portions and a pair of pin bosses and a second piece which includes a crown portion with an upper combustion surface and an at least partially enclosed oil gallery. The first and second pieces are joined together at a joint that is located on a side of the oil gallery opposite of the upper combustion surface. The first piece is made through casting or forging, and the second piece is made through an additive manufacturing process, such as direct metal laser sintering.

15 Claims, 4 Drawing Sheets

(52) U.S. Cl.
CPC ... *F02F 2003/0007* (2013.01); *F02F 2200/04* (2013.01); *F02F 2200/06* (2013.01); *Y02P 10/25* (2015.11); *Y10T 29/49252* (2015.01); *Y10T 29/49254* (2015.01)

(58) Field of Classification Search
CPC ...... F02F 3/0061; F02F 3/0038; F02F 3/0053; F02F 2200/00; B22F 3/008; B22F 3/1055; B22F 5/008; Y02P 10/295; Y10T 29/49252; Y10T 29/49254; Y10T 29/49249; B23B 15/10
USPC ........... 123/193.6; 164/76.1; 228/173.1, 114; 29/888.042, 888.043
See application file for complete search history.

(56) References Cited

U.S. PATENT DOCUMENTS

| | | | |
|---|---|---|---|
| 5,653,021 A | 8/1997 | Matsuyama et al. | |
| 6,546,626 B2 | 4/2003 | Otte et al. | |
| 6,675,761 B2 | 1/2004 | Grassi | |
| 7,337,539 B2 | 3/2008 | Mayr-Kohn | |
| 7,383,808 B1* | 6/2008 | Azevedo | F02F 3/0069 |
| | | | 123/193.6 |
| 7,458,358 B2 | 12/2008 | Lineton et al. | |
| 8,136,243 B2 | 3/2012 | Reichstein et al. | |
| 8,919,319 B2* | 12/2014 | Takada | F16J 1/08 |
| | | | 123/193.6 |
| 9,593,774 B2* | 3/2017 | Baeriswyl | F04B 1/124 |
| 9,765,727 B2* | 9/2017 | Evers | F02F 3/0084 |
| 2004/0055460 A1* | 3/2004 | Kohnert | F02F 3/0084 |
| | | | 92/185 |
| 2005/0092739 A1 | 5/2005 | Ribeiro et al. | |
| 2005/0132569 A1 | 6/2005 | Clark et al. | |
| 2008/0314240 A1* | 12/2008 | Walker | B22F 5/008 |
| | | | 92/186 |
| 2009/0000470 A1 | 1/2009 | Reichstein et al. | |
| 2009/0183850 A1 | 7/2009 | Morrison | |
| 2009/0194059 A1 | 8/2009 | Grahle et al. | |
| 2010/0258064 A1 | 10/2010 | Rebello | |
| 2011/0057056 A1 | 3/2011 | Ziminsky et al. | |
| 2011/0203547 A1* | 8/2011 | Gildemeister | F02F 3/22 |
| | | | 123/197.2 |
| 2012/0222644 A1* | 9/2012 | Bing | B23K 26/28 |
| | | | 123/193.6 |
| 2013/0008395 A1* | 1/2013 | Keller | F02F 3/22 |
| | | | 123/41.39 |
| 2013/0025561 A1 | 1/2013 | Gabriel et al. | |
| 2013/0118438 A1 | 5/2013 | Lineton | |
| 2013/0174728 A1 | 7/2013 | Azevedo et al. | |
| 2013/0186237 A1 | 7/2013 | Christopherson, Jr. et al. | |
| 2014/0044982 A1 | 2/2014 | Suh | |
| 2014/0103015 A1 | 4/2014 | Castagne et al. | |

FOREIGN PATENT DOCUMENTS

| | | | | |
|---|---|---|---|---|
| DE | 102013205244 A1 * | 9/2014 | | B22F 3/1055 |
| GB | 2361759 A | 10/2001 | | |
| JP | 2004308661 A | 11/2004 | | |
| JP | 2008531841 A | 8/2008 | | |
| JP | 2008267158 A | 11/2008 | | |
| JP | 2011058792 A | 3/2011 | | |
| JP | 2011506830 A | 3/2011 | | |
| JP | 2012523524 A | 10/2012 | | |
| WO | 200600846 A1 | 1/2006 | | |
| WO | 2006008463 A1 | 1/2006 | | |
| WO | 2006079459 A1 | 8/2006 | | |
| WO | 2012148233 A1 | 11/2012 | | |
| WO | 2012160291 A1 | 11/2012 | | |

OTHER PUBLICATIONS

Machine Translation of DE 102013205244 A1 pdf File Name: "DE102013205244A1_Machine_Translation.pdf".*
International Search Report mailed Aug. 6, 2014 (PCT/US2014/032931).

* cited by examiner

PISTON MADE USING ADDITIVE MANUFACTURING TECHNIQUES

CROSS-REFERENCE TO RELATED APPLICATION

This application claims the benefit of application Ser. No. 61/808,976, filed Apr. 5, 2013, the disclosure of which is incorporated herein by reference.

BACKGROUND OF THE INVENTION

1. Field of the Invention

The present invention relates generally to pistons for internal combustion engines and to methods of making pistons for internal combustion engines.

2. Related Art

Engine manufacturers are encountering increasing demands to improve engine efficiencies and performance including, but not limited to, improving fuel economy, improving fuel combustion, reducing oil consumption and increasing exhaust temperature for subsequent use to heat the passenger compartment of the vehicle. Advanced technologies, such as direct injection, superchargers and/or turbochargers are being employed to achieve one or more of these objectives. A common effect of such advanced technologies is increased combustion pressures and temperatures. Some piston manufacturers have turned to making piston bodies of steel and providing those steel piston bodies with one or more oil galleries to for cooling during operation of the engine. There is a continuing need to improve the performance of the oil galleries to allow the piston to perform in still further increased combustion pressures and temperatures.

SUMMARY OF THE INVENTION AND ADVANTAGES

An aspect of the present invention provides for a method of making a monobloc piston body for an internal combustion engine. The method includes the step of casting or forging a first piece of the piston body. The method continues with the step of making a second piece of the piston body through an additive manufacturing process. The method then proceeds with the step of joining the first and second pieces together.

Making the piston body partially through an additive manufacturing process provides for a number of advantages as compared to conventional processes. For example, certain features, such as oil galleries or combustion bowls with certain complex shapes, cannot cost effectively be made through conventional manufacturing processes. The use of additive manufacturing processes to create these features overcomes those problems.

According to another aspect of the present invention, the cast or forged first piece includes a pair of skirt portions and a pair of pin bosses, and the second piece made through the additive manufacturing process includes an upper combustion surface and an at least partially enclosed oil gallery. This may be particularly advantageous because it allows the second piece with the upper combustion surface to be made of a material that is more oxidation resistant than the material of the first piece with the skirt portions and the pin bosses.

According to yet another aspect of the present invention, the first and second pieces of the piston body are joined together through welding, e.g., friction welding.

Another aspect of the present invention provides for a different method of making a piston body for an internal combustion engine. This method includes the step of casting or forging a portion of a piston body. This method continues with the step of melting a metallic powder through an additive manufacturing process to build the remainder of the piston body onto the cast or forged portion of the piston body.

Another aspect of the present invention, a monobloc piston body for an internal combustion engine is provided. The piston body includes a first piece with a pair of skirt portions and a pair of pin bosses and a second piece with a crown portion having an upper combustion surface and an at least partially enclosed oil gallery. The first and second pieces are joined together at a joint which is located on a side of the oil gallery opposite of the upper combustion surface.

According to another aspect of the present invention, the second piece is made of a material which has an increased oxidation resistance as compared to the first piece.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
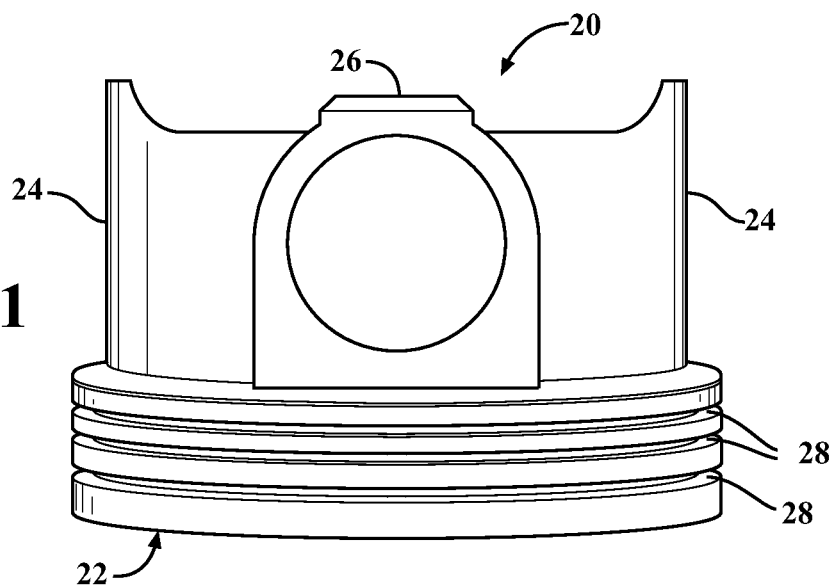
FIG. 1 is a front elevation view of an exemplary embodiment of a piston body.
Figure 2:
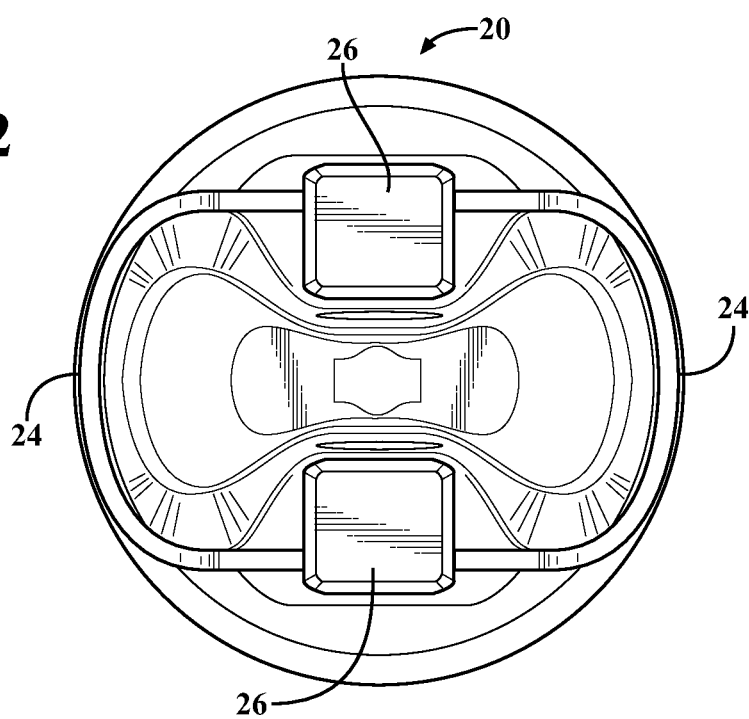
FIG. 2 is a bottom elevation view of the piston body of FIG. 1.

Referring to the Figures, wherein like numerals indicate corresponding parts throughout the several views, FIGS. 1-4 illustrate a piston body 20 which is constructed according to one aspect of the present invention. More particularly, in its final form, the exemplary piston body 20 of FIGS. 1-4 of a monobloc design in that it includes a crown portion 22, a pair of skirt portions 24 and a pair of pin bosses 26 which are all integrally connected with one another to present a one piece piston body 20 and is formed partially with an additive manufacturing process, such as direct metal laser sintering (DMLS). The piston body 20 of the exemplary embodiment is configured for use with a diesel fueled, compression ignition internal combustion engine. However, it should be appreciated that the piston body could alternately be configured for use with a range of different types of internal combustion engines including, for example, spark or compression ignition two or four stroke internal combustion engines.

Referring still to FIGS. 1-4, the crown portion 22 has a radially outwardly facing and generally cylindrically shaped ring belt region with a plurality of ring grooves 28 for accommodating one or more piston rings (not shown) to seal the piston 20 against a cylinder wall (not shown) of an internal combustion engine. The crown portion 22 of the exemplary piston 20 also has an upper combustion surface with a "Mexican hat" shaped combustion bowl 30 formed therein. It should be appreciated that the combustion bowl 30 could have any suitable shape or configuration and that, depending upon the particular application for which the piston body is designed, the crown portion could alternately be formed without a combustion bowl.

Figure 3:
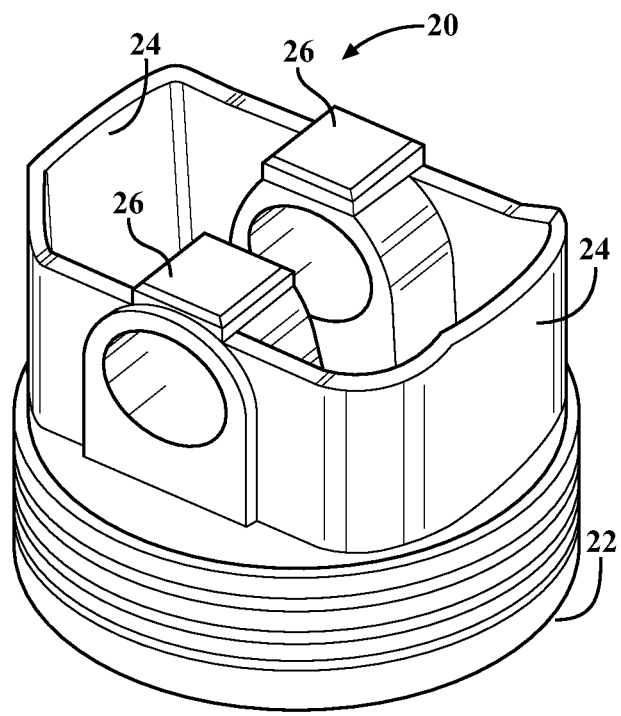
FIG. 3 is a perspective elevation view of the piston body of FIG. 1.
Figure 4:
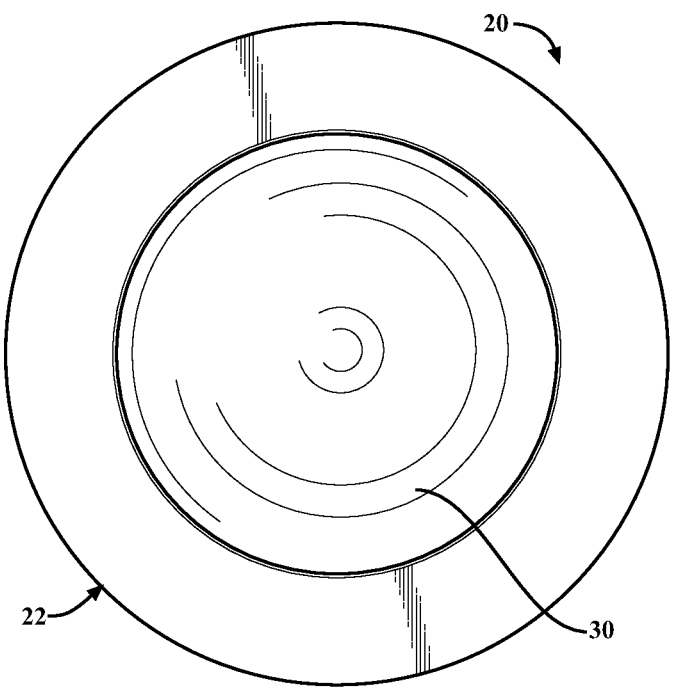
FIG. 4 is a top elevation view of the piston body of FIG. 1.

Referring back to FIGS. 1-3, the skirt portions 24 and pin bosses 26 depend from the crown portion 22 and extend axially downwardly therefrom. As best shown in FIGS. 1 and 3, the pin bosses 26 present pin bores 30 which are aligned with one another along a pin bore axis for receiving a gudgeon pin (also known as a wrist pin) to connect the piston 20 with a connecting rod (not shown) and ultimately with a crank shaft (not shown) of an internal combustion engine.

Figure 5:
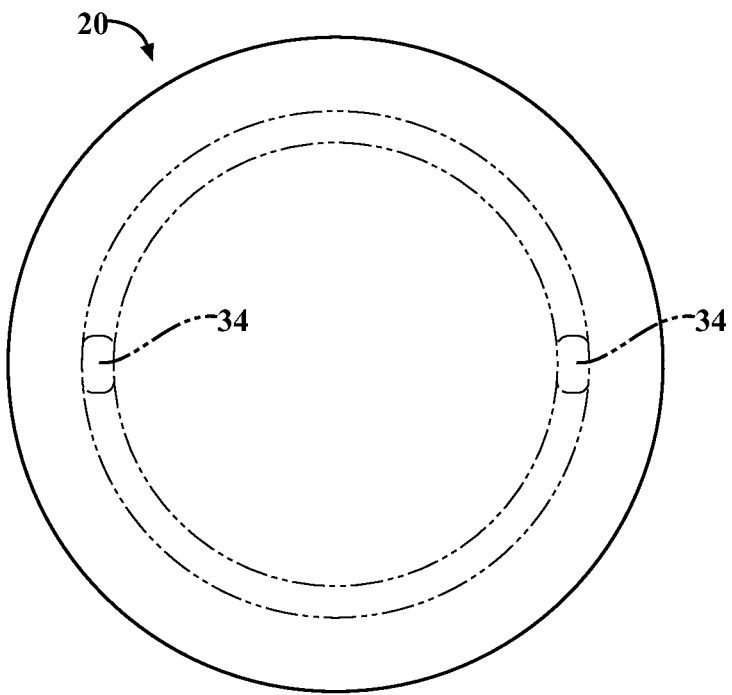
FIG. 5 is an X-Ray view of the piston body of FIG. 1 and showing an internal cooling gallery.
Figure 7:
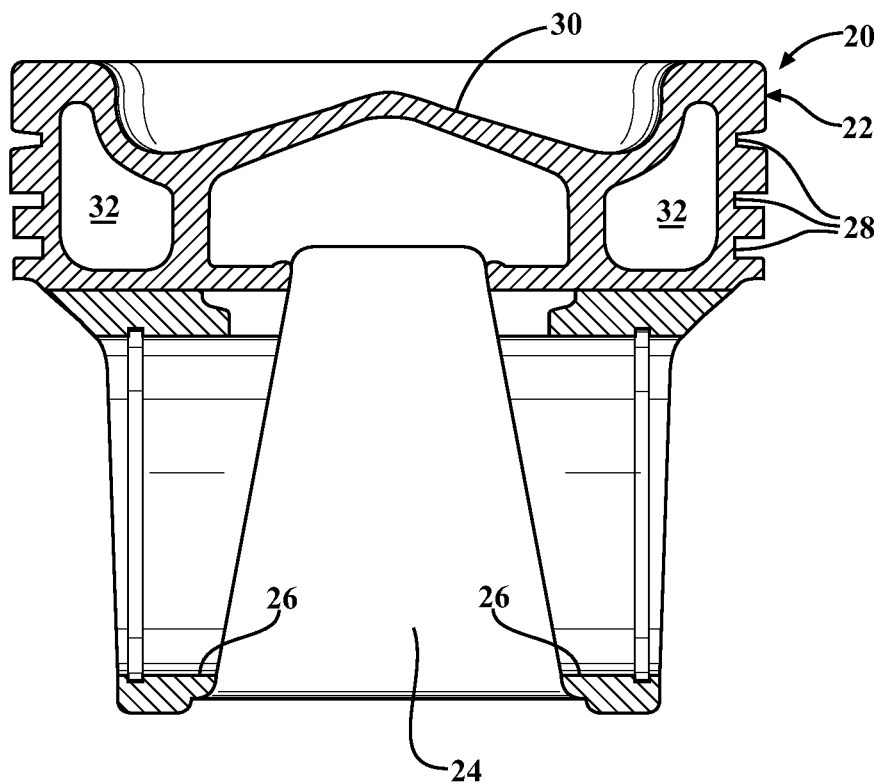
FIG. 7 is a cross-sectional view of the exemplary piston body of FIG. 1.

Referring now to the cross-sectional view of FIG. 7, the crown portion 22 of the piston body 20 has an enclosed oil gallery 32 formed therein for receiving and carrying a cooling oil (or any other cooling fluid) to cool the crown portion 22 during operation of the internal combustion engine. In the exemplary embodiment, the oil gallery 32 is generally ring or annularly shaped and extends three hundred and sixty degrees (360°) around the axis. As shown in FIG. 5, the piston body 20 also has at least one opening 34 (two openings 34 being shown in the exemplary embodiment) for receiving the cooling oil into the oil gallery 32 from one or more oil jets (not shown) and also to dispense the cooling oil from the oil gallery 32 and back to the crank case of the internal combustion engine during operation of the engine. This continuous cycling of oil into oil gallery 32 has the effect of extracting heat from the crown portion 22 to cool the crown portion 22 and allow it to operate in increased combustion pressures and temperatures.

Referring back to FIG. 7, according to this aspect of the present invention, the monobloc piston body 20 is made of two pieces which are formed separately and are joined together. Specifically, the skirt portions 24 and the pin bosses 26 are formed as one integral piece (hereinafter referred to as a "first piece") which is shaped through a non-additive manufacturing process, such as, casting or forging. The other piece (hereinafter referred to as a "second piece"), which includes the crown portion 22, is formed through an additive manufacturing process or technique, such as DMLS. Since the first and second pieces are separately formed, they could be made of different materials. For example, the second piece with the crown portion 22 could be formed of steel to withstand the high combustion pressures and temperatures while the first piece could be formed of aluminum or an aluminum alloy to reduce the total weight of the piston body. Alternately, the first and second pieces could be formed of different grades of steel to provide for optimization of the weight and performance of the piston body 20. The second piece could also be made of a material which is more resistant to oxidation than the material of the first piece. The first and second pieces could be joined together through, for example, friction welding, induction welding, brazing, mechanical fasteners or any suitable technique.

As shown, the oil gallery 32 is entirely formed within the first piece, which has the crown portion 22. As such, the joint between the first and second pieces is located on the side of the oil gallery 32 opposite of the upper combustion surface. The oil gallery 32 is entirely formed through the additive manufacturing processes or technique, e.g., DMLS. As such, the oil gallery 32 has generally smooth walls and does not include welding flash formed therein as is typically found in other pistons with oil galleries. This may allow for improved performance since there is no welding flash to interfere with the movement of the oil into and out of and also within the oil gallery 32. Additionally, forming crown portion 22 through the additive manufacturing process or technique may allow for more complicated shapes than would otherwise be possible to further enhance the cooling of the crown portion 22. Still further, the grooves 28 of the ring belt may be directly formed into the crown portion 22 during the additive forming process, thereby eliminating, or at least reducing, the machining needed to shape the grooves 28. This may allow for increased manufacturing efficiency and reduced costs.

Figure 6:
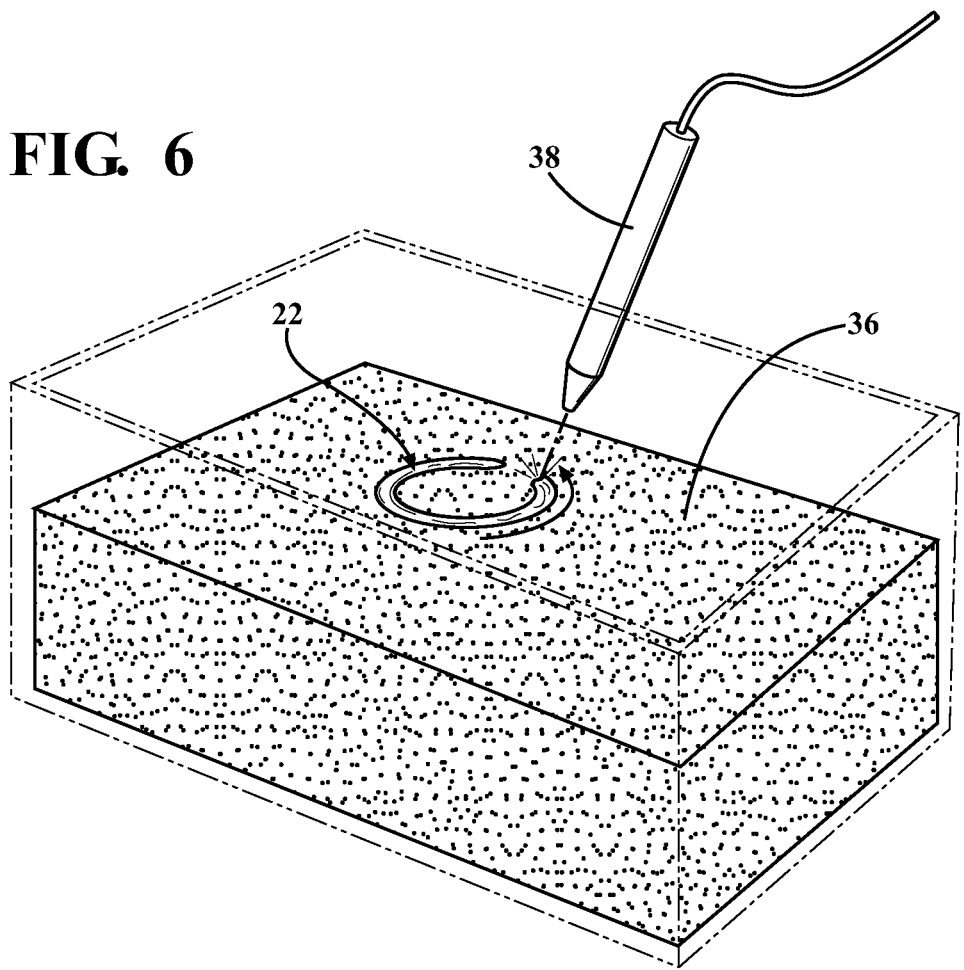
FIG. 6 is a perspective view showing a portion of a piston body being partially formed through a direct metal laser sintering operation.

FIG. 6 shows the crown portion 22 being formed through DMLS. During the DMLS process, a metal powder 36 on a build platform is selectively melted by a high powered laser 38 along a predetermined pattern to create a layer or slice of the crown portion 24. This process is repeated a predetermined number of times while varying melting pattern according to the different shapes of the slices until all of the slices are complete to create the crown portion 22.

Figure 8:
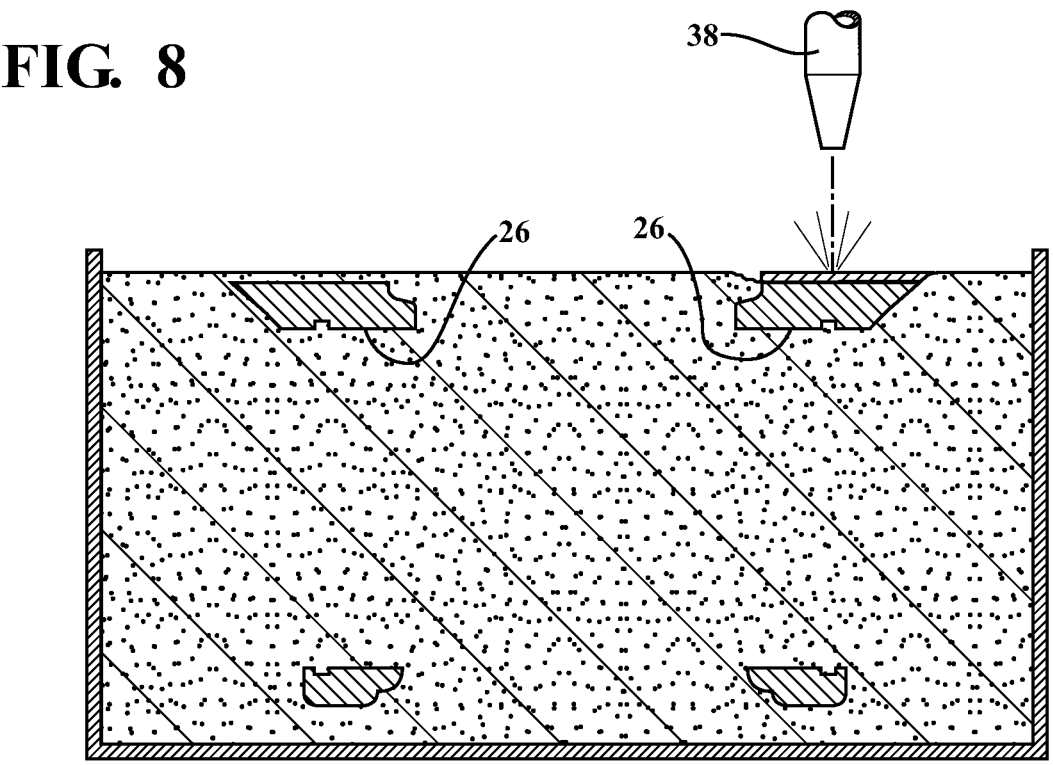
FIG. 8 is a perspective view showing another portion of a piston body being formed through a direct metal laser sintering operation.

Referring now to FIG. 8, according to another aspect of the present invention, the first piece with the skirt portions 24 and the pin bosses 26 is formed through casting or forging and is loaded into a DMLS machine. The DMLS process is then begun to melt a metal powder 36 along predetermined patterns, thereby directly joining the second piece with the crown portion 22 (shown in FIG. 1) into engagement with the first piece during the making of the second piece. Since the joining of the second piece to the first piece takes place simultaneous to the making of the first place, a separate joining process (e.g., welding) is not required.

Another aspect of the present invention is a method of making a monobloc piston body 20 for an internal combustion engine. The method includes the step of casting or forging a first piece of the piston body 20 to include a pair of skirt portions 24 and a pair of pin bosses 26. The method continues with the step of making a second piece of the piston body 20 through DMLS. The steps of making the second piece and of joining the first and second pieces together can either take place simultaneously (by directly making the second piece onto the first piece) or the second piece could be formed separately from the first piece and the two pieces could be subsequently joined together, e.g., through welding.

Obviously, many modifications and variations of the present invention are possible in light of the above teachings and may be practiced otherwise than as specifically described while within the scope of the appended claims.

What is claimed is:

1. A method of making a piston body for an internal combustion engine, comprising the steps of:
   casting or forging a first portion of a piston body for use in an internal combustion engine; and melting a metallic powder through an additive manufacturing process along predetermined patterns directly onto the first portion of the piston body to build the remainder of the piston body in situ on the first portion of the piston body to simultaneously make a monolithic second portion of the piston body and join the second portion with the first portion of the piston body and such that in a final form the piston body includes a combustion surface and a pair of skirt portions and a pair of pin bosses and wherein at least one of the combustion surface, skirt portions and pin bosses is formed into the second portion of the piston body through the additive manufacturing process.

2. The method as set forth in claim 1 wherein the additive process is direct metal laser sintering.

3. The method as set forth in claim 1 wherein the first portion of the piston body includes the pair of skirt portions and the pair of pin bosses and wherein the second portion of the piston body includes the upper combustion surface and an at least partially enclosed oil gallery and wherein the oil gallery is entirely bound by the second portion of the second body in both an axial direction and a radial direction.

4. The method as set forth in claim 1 wherein the metallic powder is of a different material than the cast or forged portion of the piston body.

5. A method of making a monobloc piston body for an internal combustion engine, comprising the steps of:
casting or forging a first piece of a piston body for use in an internal combustion engine;
making a monolithic second piece of the piston body through an additive manufacturing process, the second piece being made as a monolithic piece and presenting an upper combustion surface and an at least substantially closed oil gallery; and
joining the first and second pieces together at a joint which is located on an opposite side of the at least substantially closed oil gallery from the upper combustion surface such that the at least substantially closed oil gallery is bound by the monolithic second piece in both an axial direction and a radial direction.

6. The method as set forth in claim 5 wherein the cast or forged first piece includes a pair of skirt portions and a pair of pin bosses.

7. The method as set forth in claim 5 wherein the additive manufacturing process used to make the second piece of the piston body is direct metal laser sintering.

8. The method as set forth in claim 7 wherein the steps of making the second piece of the piston body through direct metal laser sintering and joining the first and second pieces together simultaneous to one another with the material of the second piece being formed directly onto the first piece.

9. The method as set forth in claim 8 wherein the step of making the second piece of the piston body through direct metal laser sintering includes melting a metallic powder onto a surface of the first piece.

10. The method as set forth in claim 7 wherein the first and second pieces of the piston body are joined together through welding.

11. The method as set forth in claim 5 wherein the step of joining the first and second pieces together is further defined as welding the first and second pieces together.

12. The method as set forth in claim 11 wherein the welding to join the first and second pieces together is friction welding.

13. A piston comprising:
a first piece having a pair of skirt portions and a pair of pin bosses;
a monolithic second piece having a crown portion with an upper combustion surface and a gallery that is wholly contained within the second piece, wherein the gallery is substantially fully enclosed by a pair of radially spaced side walls, a top wall that spans radially between and unites the side walls at a top of the gallery, and a bottom wall that spans radially between and unites the side walls at a bottom of the gallery, and wherein the top and side walls are formed as a single monolithic unitary piece with the bottom wall; and
wherein a joint connects the first piece to the second piece and wherein the joint is spaced below and which does not intersect the gallery.

14. The monobloc piston body as set forth in claim 13 wherein the first and second pieces are made of different materials.

15. The monobloc piston body as set forth in claim 14 wherein the material of the second piece has an increased oxidation resistance as compared to the material of the first piece.

* * * * *